United States Patent
Barton et al.

(10) Patent No.: US 7,257,842 B2
(45) Date of Patent: Aug. 14, 2007

(54) PRE-APPROVAL OF COMPUTER FILES DURING A MALWARE DETECTION

(75) Inventors: Christopher Andrew Barton, Buckingham (GB); Simon Neil Reed, Wokingham (GB); Martin Alan Brown, Bicester (GB)

(73) Assignee: McAfee, Inc., Santa Clara, CA (US)

( * ) Notice: Subject to any disclaimer, the term of this patent is extended or adjusted under 35 U.S.C. 154(b) by 843 days.

(21) Appl. No.: 10/622,709

(22) Filed: Jul. 21, 2003

(65) Prior Publication Data
US 2005/0021994 A1    Jan. 27, 2005

(51) Int. Cl.
G06F 11/30   (2006.01)
G06F 7/04    (2006.01)
H04L 9/00    (2006.01)

(52) U.S. Cl. .................. 726/24; 713/187; 713/188
(58) Field of Classification Search .................. None
See application file for complete search history.

(56) References Cited

U.S. PATENT DOCUMENTS

| | | | |
|---|---|---|---|
| 6,021,510 A | | 2/2000 | Nachenberg |
| 6,928,550 B1 * | | 8/2005 | Le Pennec et al. ............. 726/1 |
| 6,944,772 B2 * | | 9/2005 | Dozortsev ................... 713/187 |
| 6,976,271 B1 * | | 12/2005 | Le Pennec et al. ........... 726/24 |
| 6,986,051 B2 * | | 1/2006 | Le Pennec et al. ......... 713/188 |
| 7,055,175 B1 * | | 5/2006 | Le Pennec et al. ........... 726/24 |
| 7,099,916 B1 * | | 8/2006 | Hericourt et al. ........... 709/203 |
| 2001/0020272 A1 * | | 9/2001 | Le Pennec et al. ......... 713/200 |
| 2003/0074574 A1 * | | 4/2003 | Hursey et al. .............. 713/200 |
| 2004/0181687 A1 * | | 9/2004 | Nachenberg et al. ....... 713/201 |
| 2006/0143713 A1 * | | 6/2006 | Challener et al. ............. 726/24 |

OTHER PUBLICATIONS

F. Cohen, "A Cryptographic Checksum for Integrity Protection", no date provided.

* cited by examiner

*Primary Examiner*—Christopher Revak
(74) *Attorney, Agent, or Firm*—Zilka-Kotab, PC; Christopher J. Hamaty

(57) ABSTRACT

A malware detection system seeking to identify computer viruses, worms, Trojans, banned files and the like acts to determine from the file name, file size and storage location of a computer file being tested, whether that computer file potentially matches a specific known malware free computer file stored within a list of such specific known malware free computer files. If a match occurs indicating that the candidate computer file is potentially the specific known malware free computer file, then this is confirmed by calculating a checksum of the candidate computer file and comparing this against a stored corresponding checksum of the specific known malware free computer file. If these checksums match, then the candidate computer file can be passed as clean without requiring further time consuming malware detection scanning.

30 Claims, 4 Drawing Sheets

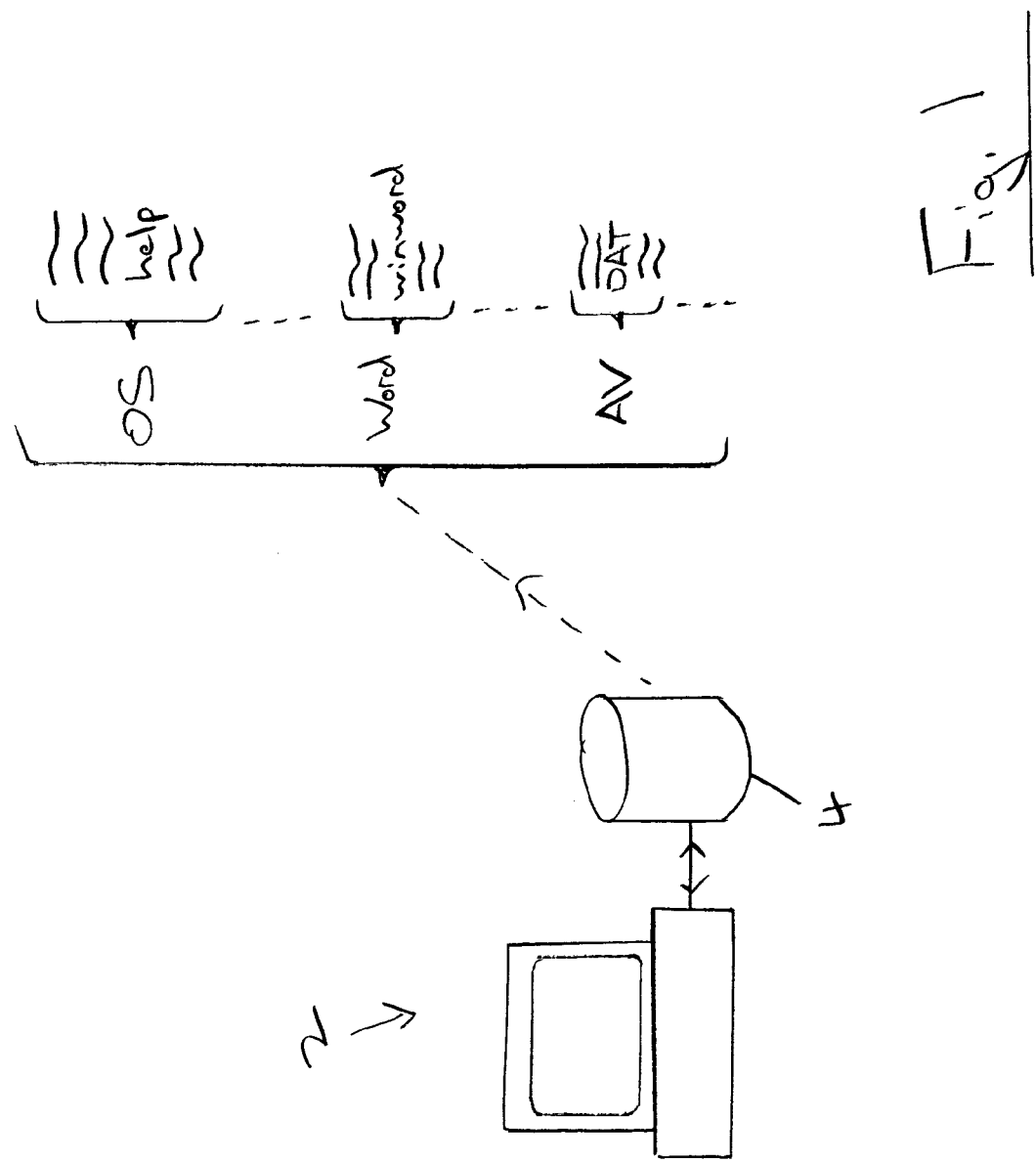

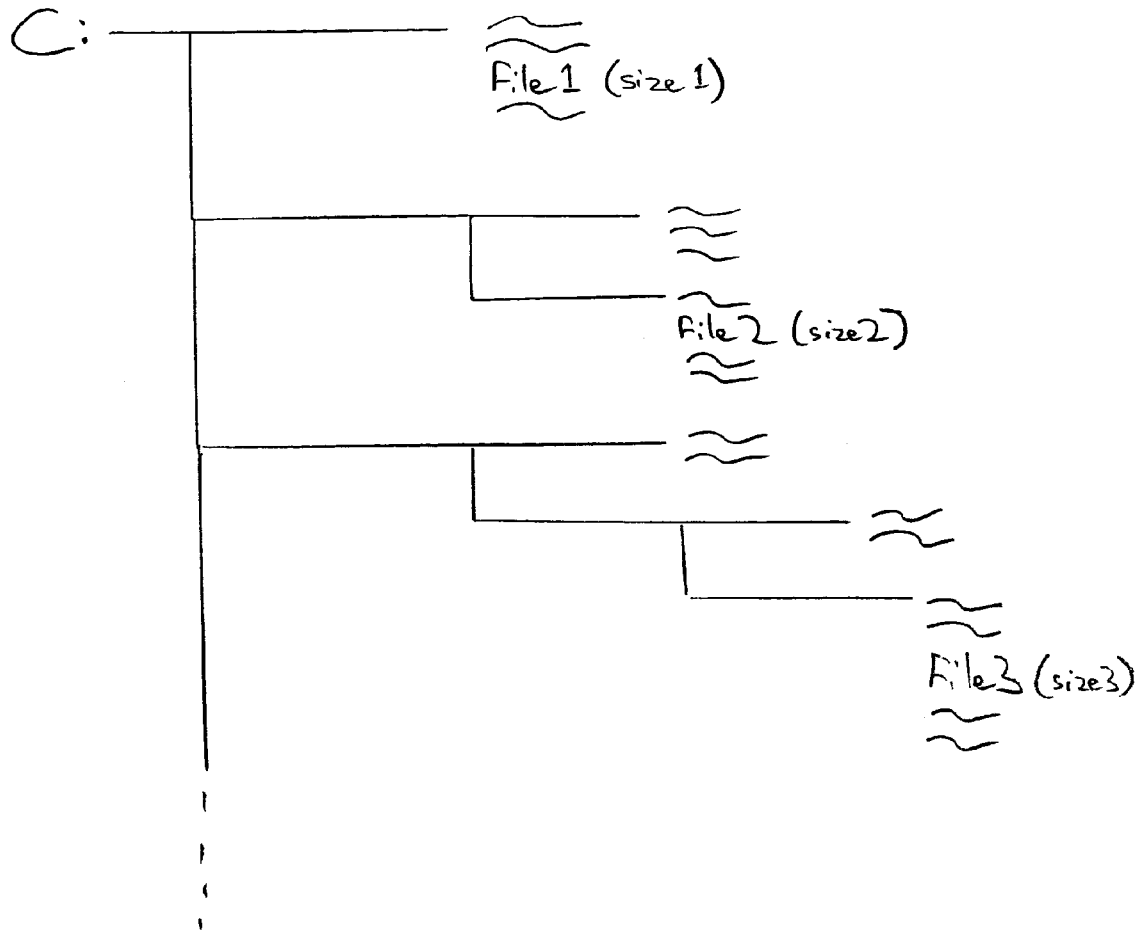

PRE-APPROVAL OF COMPUTER FILES DURING A MALWARE DETECTION

BACKGROUND OF THE INVENTION

1. Field of the Invention

This invention relates to data processing systems. More particularly, this invention relates to malware detection within data processing systems, such as, for example, detecting computer viruses, computer worms, computer Trojans, banned computer files and the like.

2. Description of the Prior Art

The threat posed by malware, such as computer viruses, is well known and is growing. Computer viruses are becoming more common, more sophisticated and harder to detect and counteract. Computer systems and software for counteracting malware typically operate by seeking to identify characteristics of known malware within a computer file being checked. A malware signature file typically contains data for identifying many thousands of different types of computer virus, Trojan, worm etc., as well as some characteristics generally indicative of malware and against which a computer file will need to be checked. With the rapid increase in the number, complexity and size of computer files present on a computer and requiring checking, the amount of processing required and accordingly time needed to conduct malware detection is disadvantageously increasing. In the case of an on-access scan which is performed before access is allowed to a computer file, the delay introduced by first scanning that computer file for the presence of malware can introduce a noticeable and disadvantageous delay in the responsiveness of the computer system. In the case of an on-demand scan where the entire contents of a computer are checked for malware, this check can take many minutes to perform and render the computer unusable for other purposes during this time.

One technique for speeding up malware detection that has previously been used is only to scan types of file which are executable. Potentially executable file types were previously restricted to relatively few types, such as EXE file types and COM file types. However, with the advent of more complex files and structures within files, it is now difficult to safely assume that a particular file type cannot contain any executable content and accordingly cannot contain malware. Furthermore, as well as requiring a larger number of types of file to be subject to scanning, if not all file types, the increased complexity of the structures within files results in more processing being required to unpack and unravel those structures in order to effectively detect any malware which may be present within those computer files.

It is known from U.S. Pat. No. 6,021,510 to provide an anti-virus accelerator which when a file is examined for an initial time and found to be clean, then a hash value for each scanned sector for that file can be stored. Upon a subsequent attempt to scan that file, the file sectors which were examined in the initial scan can be examined again and their hash values recalculated and compared with the stored hash values. If the hash values match, then the sector can be considered to be unaltered and still clean.

The paper "A Cryptographic Checksum For Integrity Protection" published in Computers & Security, Volume 6, 1987, pages 505-510 by F. Cohen describes a cryptographic checksum technique for verifying the integrity of information in a computer system with no built in protection.

SUMMARY OF THE INVENTION

Viewed from one aspect the present invention provides a computer program product carrying a computer program operable to control a computer to detect malware within a computer file, said computer program comprising:

identifying code operable to identify said computer file as potentially being a specific known malware free computer file;

determining code operable to determine one or more attributes of said computer file; and comparing code operable to compare said one or more attributes determined from said computer file with corresponding stored attributes of said specific known malware free computer file; wherein if said attributes match, then confirming said computer file as being said specific known malware free computer file; and if said attributes do not match then performing further malware detection processing upon said computer file.

The present invention recognizes that there are some computer files which are highly likely to be present on many different computers and installations. As an example, the Windows operating system produced by Microsoft Corporation (™) is widely used on an overwhelming majority of personal computers in the business environment. This operating system includes many large and complex files which are present on all such computers. Some of these computer files take a sufficiently disadvantageous degree of processing to malware scan that it instead becomes worthwhile to specifically check and identify a computer file as being a particular common computer file that is known to be malware free and would otherwise consume significant resources to be the subject of malware detection. Surprisingly, effectively pre-approving a relatively small number of computer files once they have been positively identified as being those computer files can make a significant impact upon the overall malware detection speed and more than compensate for the additional complexity within the malware scanner which is needed to check for pre-approval. This technique runs counter to the general prejudice in the malware detecting field where it is considered that the huge variety of different computer programs which may be stored and used on a computer necessitates a generic approach to malware detection whereby all the computer files need to be checked for all of the relevant different types of malware with which they may be infected or to which they may correspond.

It will be appreciated that in identifying a computer file as potentially being one of the specific known malware free computer files a variety of different characteristics and/or parameters associated with that computer file may be utilized. Advantageously, these include one or more of the file name, storage location and file size of the computer file concerned. These characteristics tend to be strongly indicative of a particular computer file being one of the candidates for pre-approval.

Whilst the technique could be used to pre-approval only a single specific known malware free file, such as a file which was otherwise particularly time consuming to process, the technique is particularly well suited when a plurality of different specific known malware free computer files are checked against in the pre-approval process.

Once a computer file has been identified as potentially being a specific known malware free computer file, the attributes that may be calculated for it or detected within it in order to confirm that it has not been altered in any way include calculating a checksum from a portion, portions or all of the computer file, such as a MD5 checksum, checking the content of a specific portion or portions against known content at those locations and the like. These techniques are effective in ensuring that the candidate computer file has not been tampered with and yet are quick to perform.

If a computer file is not identified as a pre-approved computer file, then normal malware detection processing may be proceeded performed in which one or more characteristics corresponding to known malware files are detected, such as from a malware signature file.

The present technique is particularly well suited for pre-approval of specific known malware free computer files being one of an operating system file, a help file and a malware detection software file itself. Such computer files are highly likely or certain to be present within a computer utilizing the present technique and yet can have a large size and a complex structure which would otherwise consume considerable resources when the subject of malware detection.

It will be appreciated that the malware being detected can take a wide variety of different forms, including a computer virus, a computer worm, a computer Trojan, a banned computer file and a computer file containing banned data.

Viewed from another aspect the present invention provides a method of detecting malware within a computer file, said method comprising the steps of:

identifying said computer file as potentially being a specific known malware free computer file;

determining one or more attributes of said computer file; and comparing said one or more attributes determined from said computer file with corresponding stored attributes of said specific known malware free computer file; wherein if said attributes match, then confirming said computer file as being said specific known malware free computer file; and if said attributes do not match then performing further malware detection processing upon said computer file.

Viewed from a further aspect the present invention provides apparatus for detecting malware within a computer file, said apparatus comprising:

identifying logic operable to identify said computer file as potentially being a specific known malware free computer file;

determining logic operable to determine one or more attributes of said computer file; and comparing logic operable to compare said one or more attributes determined from said computer file with corresponding stored attributes of said specific known malware free computer file; wherein if said attributes match, then confirming said computer file as being said specific known malware free computer file; and if said attributes do not match then performing further malware detection processing upon said computer file.

The above, and other objects, features and advantages of this invention will be apparent from the following detailed description of illustrative embodiments which is to be read in connection with the accompanying drawings.

BRIEF DESCRIPTION OF THE DRAWINGS

FIG. 1 illustrates a computer storing a plurality of different computer files;

FIG. 2 illustrates the directory structure of a computer and the location and characteristics of certain computer files which may be subject to pre-approval;

FIG. 3 illustrates pre-approval data which is used to identify a file as potentially being a specific known malware free computer file and then to confirm the identity of that computer file;

DESCRIPTION OF THE PREFERRED EMBODIMENTS

Figure 4:
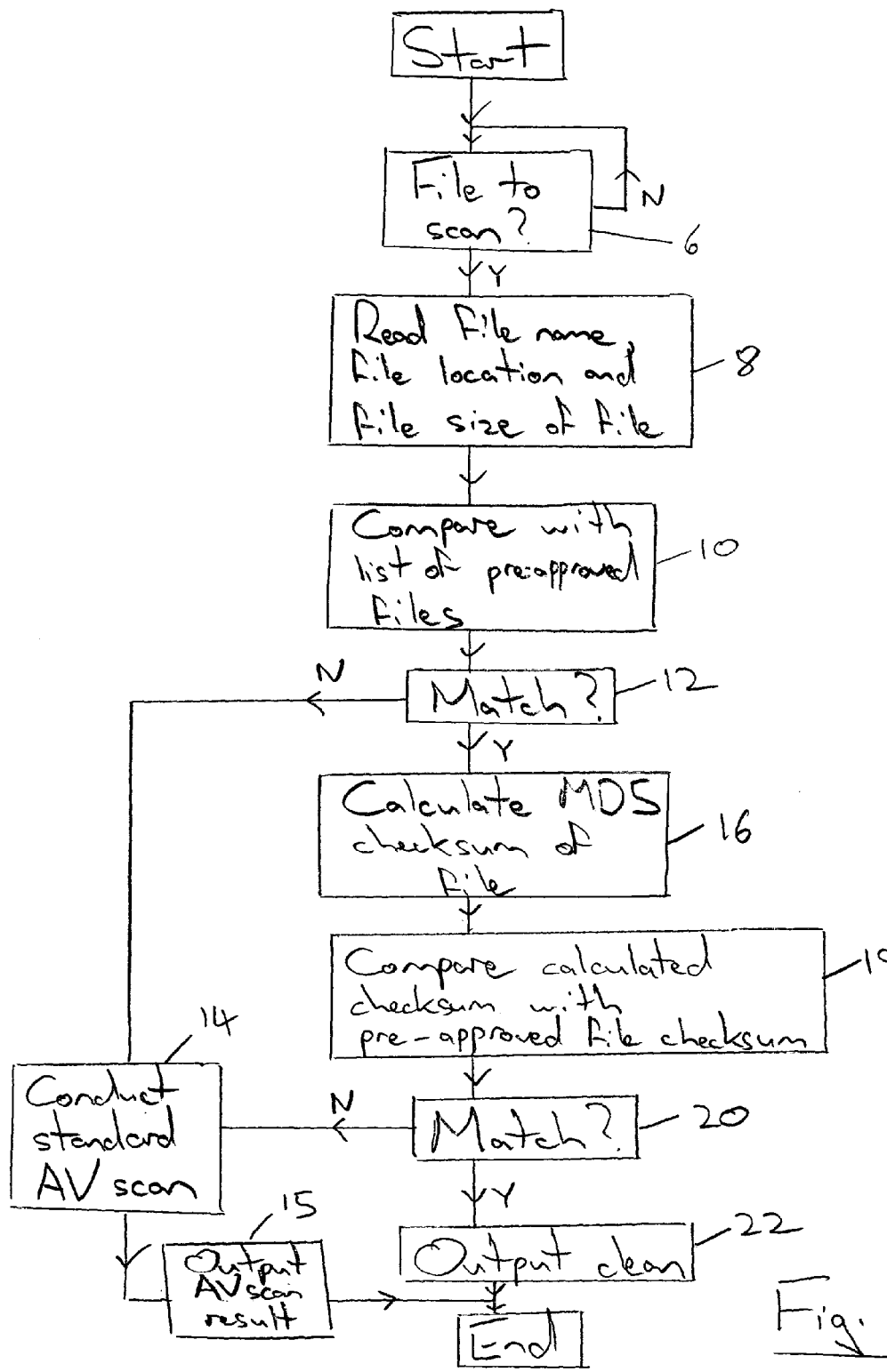
FIG. 4 is a flow diagram illustrating pre-approval processing.

FIG. 1 illustrates a computer 2 including a hard disk drive 4. The computer 2 includes malware detection software (AV software) which can perform both on-access and on-demand scanning. Also illustrated as stored upon the hard disk drive 4 are an operating system and an application program such as Microsoft Word word processing, which is commonly found upon many computers 2.

FIG. 2 schematically illustrates the directory structure used by the hard disk drive 4 to store the computer files. As illustrated, various directories and subdirectories are provided. Particular files which may be subject to pre-approval have known file names and sizes. They are also typically stored within the same or a determinable relative location within the directory structure from system to system. For example, certain computer files might always be stored in the root directory, certain computer files always stored in a WINNT directory, an OFFICE directory or the like. The location may also be determined by an existing configuration setting, such as a registry entry, configuration file, etc. The combination of file name, file type, file size and file location may be used to identify a particular computer file as potentially being a specific known malware free computer file which has been pre-approved.

FIG. 3 schematically illustrates a table of data corresponding to several different pre-approved computer files. For each pre-approved computer file, data is stored indicating file name, size and location, compared with that of a candidate computer file to identify that candidate computer file as potentially corresponding to a pre-approved computer file. Also stored is an MD5 checksum for the specific known malware free computer file is calculated from a portion, portions, or all of the specific known malware free computer files. The same checksum is calculated for the candidate computer file and if the stored checksum and the calculated checksum match, then the candidate computer file is positively identified as being the pre-approved computer file and may be passed as clean without further malware scanning. It will be appreciated that as an alternative to checksum calculation, the direct content of the computer file at certain portions or a portion may be compared and checked in order to positively identify the candidate computer file.

In FIG. 3, three pre-approved computer files are illustrated. In practice it has been found that using the present pre-approval technique in relation to what are otherwise the worst offending top 100 computer files in terms of the slowness of their malware detection scanning and the frequency with which they occur can overall yield significant improvements in malware detection processing speed, such as up to a 30% improvement. This is dramatic and highly significant. The extra time required for the pre-approval processing check and the additional storage requirement within the virus signature file is more than compensated for by the performance improvement achieved.

FIG. 4 is a flow diagram schematically illustrating the pre-approval processing check. At step 6 the system waits until a computer file to scan is received into a scanning queue. At step 8, the file name, file location and file size of the candidate computer file are read. At step 10 these read parameters are compared with a list of pre-approved files stored within the computer virus definition data. Step 12 determines whether a match occurred. If there was no match, then processing proceeds to step 14 at which standard malware detection processing is conducted following which the AV scan result is output at step 15. If a match did occur at step 12, then the computer file is a candidate to be treated as a specific known malware free computer file which can be approved without detailed malware detection. However, before the computer file is actually so approved, it must be subject to a check to determine it has not been tampered with.

At step 16 an MD5 checksum for the candidate computer file is calculated. At step 18 this calculated checksum is compared with the stored checksum determined for the specific known malware free computer file against which a match was detected at step 12. At step 20 if the checksums match, then processing proceeds to step 22 whereby the candidate computer file can be indicated as being clean without detailed malware detection needing to be performed. If the checksums did not match, then processing proceeds from step 20 to step 14 where full malware detection is performed.

It will be appreciated that the processing steps illustrated in FIG. 4, other than that of step 14, are relatively rapid compared to the long amount of time needed to conduct the standard malware detection scanning in step 14. Thus, a candidate computer file will either be identified as an unaltered pre-approved computer file thereby terminating further processing requirements for that computer file or relatively rapidly handed on to the standard malware scanning system for malware detection.

Figure 5:
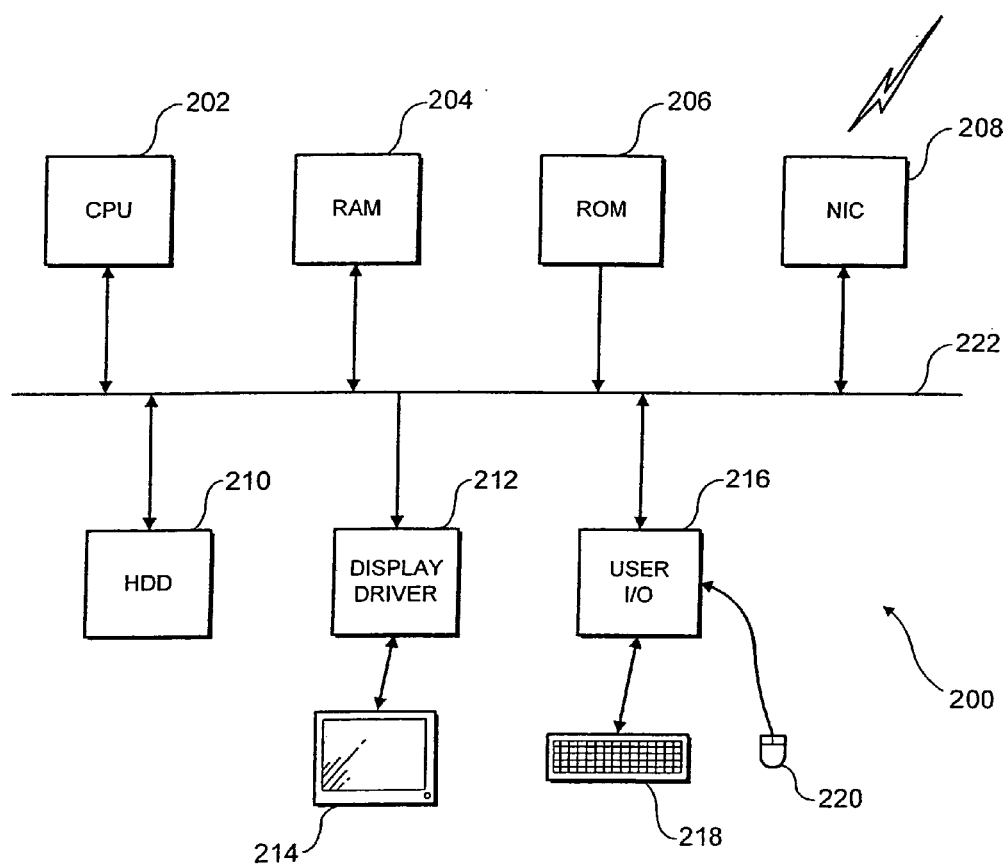
FIG. 5 is a diagram illustrating the architecture of a general purpose computer which may be used to implement the above techniques.

FIG. 5 schematically illustrates a general purpose computer 200 of the type that may be used to implement the above described techniques. The general purpose computer 200 includes a central processing unit 202, a random access memory 204, a read only memory 206, a network interface card 208, a hard disk drive 210, a display driver 212 and monitor 214 and a user input/output circuit 216 with a keyboard 218 and mouse 220 all connected via a common bus 222. In operation the central processing unit 202 will execute computer program instructions that may be stored in one or more of the random access memory 204, the read only memory 206 and the hard disk drive 210 or dynamically downloaded via the network interface card 208. The results of the processing performed may be displayed to a user via the display driver 212 and the monitor 214. User inputs for controlling the operation of the general purpose computer 200 may be received via the user input output circuit 216 from the keyboard 218 or the mouse 220. It will be appreciated that the computer program could be written in a variety of different computer languages. The computer program may be stored and distributed on a recording medium or dynamically downloaded to the general purpose computer 200. When operating under control of an appropriate computer program, the general purpose computer 200 can perform the above described techniques and can be considered to form an apparatus for performing the above described technique. The architecture of the general purpose computer 200 could vary considerably and FIG. 5 is only one example.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A computer program product carrying a computer program operable to control a computer to detect malware within a computer file, said computer program comprising:
   identifying code operable to identify said computer file as potentially being a specific known malware free computer file;
   determining code operable to determine one or more attributes of said computer file; and
   comparing code operable to compare said one or more attributes determined from said computer file with corresponding stored attributes of said specific known malware free computer file;
   wherein if said attributes match, then confirming said computer file as being said specific known malware free computer file; and
   if said attributes do not match then performing further malware detection processing upon said computer file;
   wherein said identifying code is operable to compare a file name, and a storage location of said computer file with a corresponding file name, and storage location of said specific known malware free computer file.

2. A computer program product as claimed in claim 1, wherein said identifying code is further operable to compare a file size of said computer file with a corresponding file size of said specific known malware free computer file.

3. A computer program product as claimed in claim 1, wherein said computer file is identified as being potentially one specific known malware free computer file from among a plurality of specific known malware free computer files.

4. A computer program product as claimed in claim 1, wherein said one or more attributes include one of more of:
   a checksum calculated from at least a portion of said computer file; and
   content of at least a portion of said computer file.

5. A computer program product as claimed in claim 1, wherein said further malware detection processing includes detecting within said computer file one or more characteristic corresponding to a known malware file.

6. A computer program product as claimed in claim 5, wherein said one or more characteristic corresponding to a known malware file are stored within a malware signature file.

7. A computer program product as claimed in claim 1, wherein said specific known malware free computer file is one of:
   an operating system file;
   a help file; and
   a malware detection software file.

8. A computer program product as claimed in claim 1, wherein said malware being detected is one or more of:
   a computer virus;
   a computer worm;
   a computer Trojan;
   a banned computer file; and
   a computer file containing banned data.

9. A computer program product as claimed in claim 1, wherein said storage location of said computer file is a known storage location or a relative storage location.

10. A computer program product as claimed in claim 9, wherein said relative storage location is determined by a configuration setting.

11. A computer program product as claimed in claim 1, wherein said corresponding file name, and storage location of said specific known malware free computer file are stored within a malware signature file.

12. A computer program product as claimed in claim 1, wherein said stored attributes of said specific known malware free computer file are stored within a malware signature file.

13. A computer program product as claimed in claim 1, wherein further malware detection processing is performed upon said computer file if said computer file is not identified as potentially being one specific known malware free computer file from among a plurality of specific known malware free computer files.

14. A computer program product as claimed in claim 1, wherein said identifying code, said determining code, said comparing code, and said further malware detection processing are performed by a malware scanner.

15. A method of detecting malware within a computer file, said method comprising the:
    identifying said computer file as potentially being a specific known malware free computer file;
    determining one or more attributes of said computer file; and
    comparing said one or more attributes determined from said computer file with corresponding stored attributes of said specific known malware free computer file;
    wherein if said attributes match, then confirming said computer file as being said specific known malware free computer file; and
    if said attributes do not match then performing further malware detection processing upon said computer file;
    wherein said identifying is operable to compare a file name, and a storage location of said computer file with a corresponding file name, and storage location of said specific known malware free computer file.

16. A method as claimed in claim 15, wherein said identifying further compares a file size of said computer file with a corresponding file size of said specific known malware free computer file.

17. A method as claimed in claim 15, wherein said computer file is identified as being potentially one specific known malware free computer file from among a plurality of specific known malware free computer files.

18. A method as claimed in claim 15, wherein said one or more attributes include one of more of:
    a checksum calculated from at least a portion of said computer file; and
    content of at least a portion of said computer file.

19. A method as claimed in claim 15, wherein said further malware detection processing includes detecting within said computer file one or more characteristic corresponding to a known malware file.

20. A method as claimed in claim 19, wherein said one or more characteristic corresponding to a known malware file are stored within a malware signature file.

21. A method as claimed in claim 15, wherein said specific known malware free computer file is one of:
    an operating system file;
    a help file; and
    a malware detection software file.

22. A method as claimed in claim 15, wherein said malware being detected is one or more of:
    a computer virus;
    a computer worm;
    a computer Trojan;
    a banned computer file; and
    a computer file containing banned data.

23. Apparatus for detecting malware within a computer file, said apparatus comprising:
    identifying logic operable to identify said computer file as potentially being a specific known malware free computer file;
    determining logic operable to determine one or more attributes of said computer file; and
    comparing logic operable to compare said one or more attributes determined from said computer file with corresponding stored attributes of said specific known malware free computer file;
    wherein if said attributes match, then confirming said computer file as being said specific known malware free computer file; and
    if said attributes do not match then performing further malware detection processing upon said computer file;
    wherein said identifying logic is operable to compare a file name, and a storage location of said computer file with a corresponding file name, and storage location of said specific known malware free computer file.

24. Apparatus as claimed in claim 23, wherein said identifying logic is operable to further compare a file size of said computer file with a corresponding file size of said specific known malware free computer file.

25. Apparatus as claimed in claim 23, wherein said computer file is identified as being potentially one specific known malware free computer file from among a plurality of specific known malware free computer files.

26. Apparatus as claimed in claim 23, wherein said one or more attributes include one of more of:
    a checksum calculated from at least a portion of said computer file; and
    content of at least a portion of said computer file.

27. Apparatus as claimed in claim 23, wherein said further malware detection processing includes detecting within said computer file one or more characteristic corresponding to a known malware file.

28. Apparatus as claimed in claim 27, wherein said one or more characteristic corresponding to a known malware file are stored within a malware signature file.

29. Apparatus as claimed in claim 23, wherein said specific known malware free computer file is one of:
    an operating system file;
    a help file; and
    a malware detection software file.

30. Apparatus as claimed in claim 23, wherein said malware being detected is one or more of:
    a computer virus;
    a computer worm;
    a computer Trojan;
    a banned computer file; and
    a computer file containing banned data.

* * * * *